UNITED STATES PATENT OFFICE.

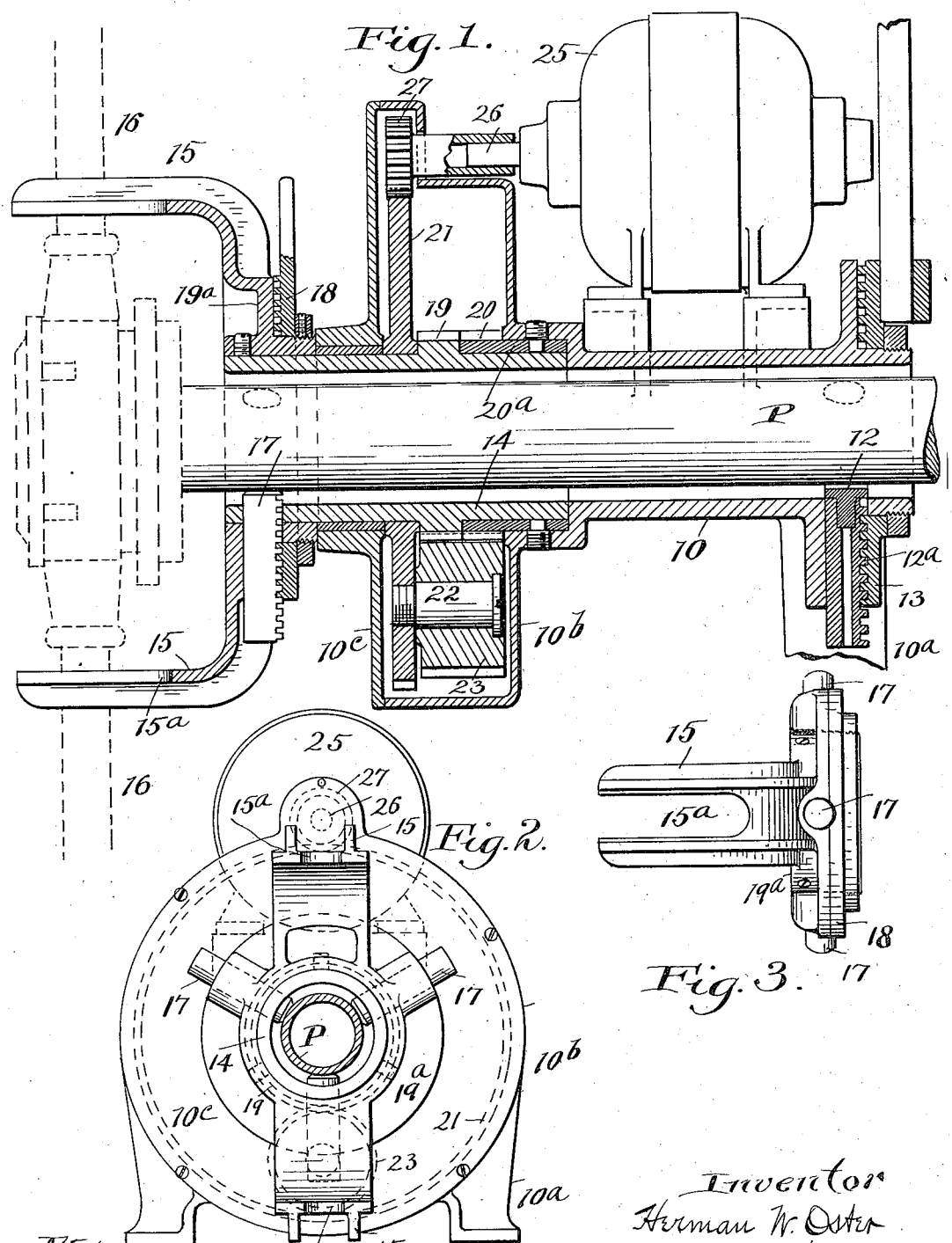

HERMAN W. OSTER, OF CLEVELAND, OHIO, ASSIGNOR TO THE OSTER MANUFACTURING COMPANY, OF CLEVELAND, OHIO, A CORPORATION OF OHIO.

PORTABLE TOOL-TURNING MACHINE.

1,199,917.  Specification of Letters Patent.  Patented Oct. 3, 1916.

Application filed November 23, 1914. Serial No. 873,434.

*To all whom it may concern:*

Be it known that I, HERMAN W. OSTER, a citizen of the United States, residing at Cleveland, in the county of Cuyahoga and State of Ohio, have invented a certain new and useful Improvement in Portable Tool-Turning Machines, of which the following is a full, clear, and exact description.

This invention is a portable self-contained machine, organized to do the work which a man is ordinarily required to do when he is away from his shop, to operate a rotatable tool. The machine, as shown, is especially organized to rotate a die stock, which is a thread-cutting tool primarily intended for hand operation. The greatest field of usefulness for die stocks is for threading gas, steam and water pipes, for installation in buildings. These pipes, or many of them, must be cut to the proper lengths "on the job", and cannot be threaded until so cut. They may then be taken back to the shop and threaded by power-driven thread-cutting machines, or, as is the most common practice, they may be clamped in a vise and threaded by manually operated die stocks.

The primary object of this invention is to provide a portable self-contained machine which will hold the pipe while being threaded, and which will likewise turn an ordinary die stock,—thereby doing the work of the man and the vise.

The invention consists in the construction and combination of parts shown in the drawing and hereinafter described and pointed out definitely in the appended claims.

In the drawings Figure 1 is a vertical, central, longitudinal section of a machine embodying the invention; Fig. 2 is an end elevation from the left end of Fig. 1; and Fig. 3 is a top view of the outer tool-engaging end of the rotatable member of the machine.

Referring to the parts by reference characters, 10 represents a tubular frame member provided with suitable supporting legs $10^a$. Near one end this tubular frame member is enlarged to form a gear casing $10^b$. This has a removable end cap $10^c$. This frame member serves as a work holder and is provided with means for securely gripping and preventing the revolution of the pipe P which passes through it. These work-gripping devices are of familiar form in die stocks. They are radially movable bars 12, whose inner ends project into the hollow center of the frame member. These work-gripping bars are provided with rack teeth $12^a$ which are engaged by spiral cam scrolls on a rotatable cam plate 13 mounted on the frame member.

14 represents the tubular die stock operator. It is rotatively mounted in that end of the tubular frame member at which such casing is formed, and it projects out beyond said end. It has on its projecting end two arms 15 which may be parallel with each other and with the axis of the members 14 and 10. Each of the outer parallel ends of these arms are formed with a slot $15^a$. Every die stock, one of which is represented conventionally by dotted lines in Fig. 1, is provided with two handles 16. These are the handles which the man ordinarily takes hold of to turn the die stock, and the slots $15^a$ are so formed that these handles may slip into them. Adjacent to these arms the projecting part of the rotatable member 14 is provided with radially moving work-alining bars 17 which are operated by a scroll cam plate 18. These slotted arms are preferably formed as part of a head $19^a$, which is separately made but is fixed to, and becomes therefore a part of, rotatably mounted member 14.

A gear 19 is formed externally on the rotatable member 14 within the casing $10^b$. Adjacent to it, and within this casing, is another gear having the same diameter but having a different number of teeth. This gear is formed upon a sleeve $20^a$ which is fixed to the tubular frame member 10. A gear 21 is rotatably mounted upon the member 14 within the gear casing. It carries a stud 22 on which a gear 23 is rotatably mounted. This gear engages both of the gears 19 and 20. When the gear 21 is turned, the member 14 will be turned slowly through the differential gearing above described.

25 is an electric motor which is secured upon the frame member 10. Its shaft 26 extends into the casing $10^b$ and is therein provided with the gear 27 which meshes with a drive gear 21.

In using this machine a pipe P to be threaded is passed through the tubular members 10 and 14 and allowed to project a suitable distance into the head 19ª. This pipe is clamped to the work-holding frame member 10 by the work gripping means described, and its projecting end is alined and steadied by the bars 17. Then the die stock is placed in the embrace of the arms 15, as indicated, and the machine is set in operation. A workman must press the die stock against the pipe until the dies of the die stock take hold and begin to cut the thread. After this, the continued turning of the die stock will cause it to continue to cut threads on the pipe, and to advance along the pipe at a rate corresponding with pitch of the threads being cut.

Although the machine, as shown, is especially organized to operate die stocks, it is obvious that it may, without change, be used to turn any rotatable tool having suitable handles or projections for engagement with the arms 15; and also that slight changes in the shape of the head are all that should be required to adapt it to turn any rotatable tool which is usually actuated by hand.

Having thus described my invention, what I claim is:

1. The combination of non-rotating means for holding work, with a rotatable member provided with slots for engaging and turning a tool having arms adapted to enter said slots, and means for turning said rotatable member.

2. The combination of a non-rotating tubular member provided with work gripping devices, a coaxial rotatable member which projects beyond the non-rotating tubular member, means provided at its said projecting end with two oppositely disposed arms in each of which is an open ended longitudinal slot, and means for turning said rotatable member.

3. The combination of a tubular frame member having work-gripping devices, a tubular member supported by said frame member and in axial alinement therewith, a motor supported upon said frame member, reducing gearing intermediate of said motor and rotatable member for turning the latter, work alining devices carried by said rotatable member,—said rotatable member having at its outer end two oppositely disposed tool engaging arms.

4. The combination of a tubular frame member having work-gripping devices, a tubular member rotatably supported by said frame member and in axial alinement therewith, a motor supported upon said frame member, reducing gearing intermediate of said motor and rotatable member for turning the latter, work alining devices carried by said rotatable member, said rotatable member having at its outer end two oppositely disposed slotted tool engaging arms.

5. The combination of a tubular frame member having work-gripping devices, and having near one end an enlarged gear-protecting casing, a tubular member which projects into that end of the frame member at which the casing is formed and is rotatably mounted in said frame member with their axes in alinement, a motor supported on said frame member, a train of gears in said casing intermediate of the motor and rotatable member, work-alining devices carried by said rotatable member,—said rotatable member having at its outer end means for engaging and turning a rotatable tool.

6. The combination of a tubular frame member, a tubular member rotatably supported by said frame member and projecting at one end beyond the same and having at the said projecting end two oppositely disposed arms provided with means for engaging and turning a tool, a motor supported upon said frame member, and reducing gearing intermediate of said motor and said rotatable member for turning the latter.

In testimony whereof, I hereunto affix my signature in the presence of two witnesses.

HERMAN W. OSTER.